No. 687,486. Patented Nov. 26, 1901.
T. PFISTER.
ENAMELED CLOISONNÉ WARE.
(Application filed Apr. 10, 1899.)

(No Model.)

Witnesses
Chas H. Smith
J. Staib

Inventor.
Theophil Pfister.
per L. W. Serrell & Son
attys.

UNITED STATES PATENT OFFICE.

THEOPHIL PFISTER, OF CHICAGO, ILLINOIS.

ENAMELED CLOISONNÉ WARE.

SPECIFICATION forming part of Letters Patent No. 687,486, dated November 26, 1901.

Application filed April 10, 1899. Serial No. 712,383. (No model.)

*To all whom it may concern:*

Be it known that I, THEOPHIL PFISTER, a citizen of the United States, residing at Chicago, in the county of Cook and State of Illinois, have invented an Improvement in Enameled Cloisonné Ware, of which the following is a specification.

In ornamental work strips of metal or other material have been used to form divisions or outlines of the pattern, and the present invention relates to the method of first forming the tile, brick, or similar article with the cells or recesses between the divisions to receive the filling material or enamel and then securing such materials in place.

Figure 2:
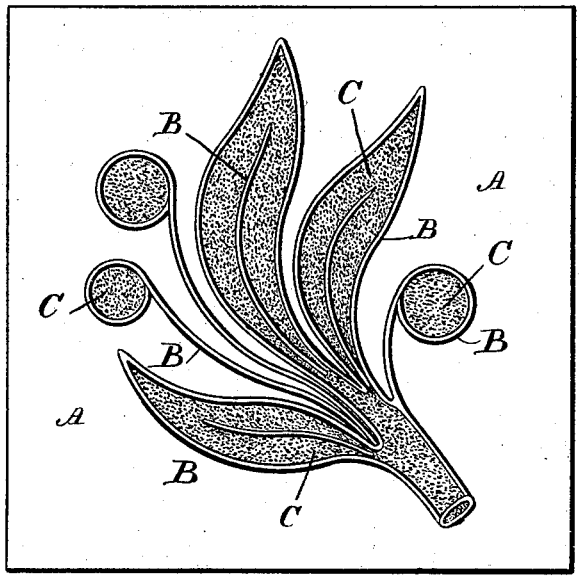
Figure 1:
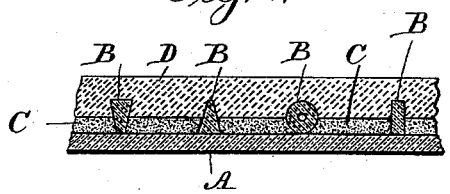

In the drawings, Figure 1 shows in magnified size a section of part of a tile, brick, or other similar article; and Fig. 2 shows the foundation-plate with the cloisonné strips in place and with the spaces between the strips filled with powdered glass or other material.

The foundation-plate A may be either flat or curved, and where it is transparent the pattern may be upon paper applied at one side and the cloisonné strips applied at the other side, or when it is opaque the pattern may be laid out upon paper or otherwise upon the foundation-plate. Upon this foundation-plate A the strips B of metal or other material are applied, the same being bent to the contour of the pattern and fastened by suitable adhesive material, preferably that which is easily dissolved in water, or the divisions may be stamped to shape or molded so as to be laid upon the foundation-plate. After the cloisonné strips have been arranged and caused to adhere upon the foundation-plate a layer of powdered glass or similar particles C in the desired colors is laid in the spaces or recesses between the cloisonné strips. The thickness of the layer, however, is not to be so great as to cover the cloisonné strips, (preferably about one-half,) so that such strips project a suitable distance above the layers of powdered glass or other particles.

A layer of suitable earthy material D, rendered plastic by water or otherwise, is now applied to fill the spaces and cover the strips and extend the pattern and is allowed to remain until it is sufficiently set or hardened to firmly hold the cloisonné strips and also to adhere to the powdered glass or similar material, and the tile or brick may now be subjected to the action of water or otherwise treated, if found necessary, to soften the adhesive material and separate the foundation-plate from the contour-strips B, so that such foundation-plate can be removed, and, if desired, the superfluous powdered glass or other particles may be allowed to fall away, leaving the strips firmly embedded in the clay or earthy material, and where the powdered glass or similar material is allowed to fall away there will be depressions or cells between the cloisonné strips. The contour-strips B may now be covered with any suitable enamel paint and the cells filled with particles of glass or enamel of the proper color, according to the design to be represented, and the work may then be placed in a suitable kiln or reverberatory furnace or oven, where a flame is caused to play upon the surface to melt the enamel or glass particles, and it is advantageous to employ glass of such a quality that it will fuse at a comparatively low temperature. Glass that contains a large proportion of lead is advantageous for this purpose. The work may then be annealed in any suitable manner, and, if desired, a fire-polish can be given to the surface.

In some instances the cloisonné strips are not enameled, and after the tile, brick, or similar article has been subjected to heat to harden the same and fuse the glass particles the surface may be subjected to a grinding or polishing operation by hand or power to obtain the desired smoothness and finished appearance, and where the contour-strips are of metal they may be gilded, bronzed, silvered, or otherwise finished by plating or otherwise to improve the appearance of the work.

A metal plate can be applied behind the clay backing for strengthening the tile or brick.

By this improved method glass of an inferior and inexpensive quality can be made use of for forming a bond with the earthy material and a more expensive and artistic material used for the surface enamel, and the parts melt together under the action of heat, and in this way highly-artistic effects are produced in a cheap manner and skilled labor is not necessary in all the operations.

If the tile or brick is not to be exposed to heat, cementing materials are to be employed in place of clay. Colors in the cement or clay may be used to correspond to the colors of the glass or other ornamental material, and it is advantageous to spread, work, or press the clay or cementing material so as to prevent injurious effects from bubbles of air therein. It is generally best to apply a frame or mold around the foundation-plate and of a width corresponding to the thickness of the finished slab, so that the filling material may be introduced to the top edges of the mold or frame and the slab be of uniform thickness.

I claim as my invention—

1. The method herein specified of producing ornamental cloisonné ware, such as tiles or bricks, consisting in applying cloisonné strips on a foundation-plate to form the contour of the pattern and introducing glass or similar material in a granular or powdered form between the contour-strips in a layer of less thickness than the depth of the contour-strips, applying over the glass particles and between and over the strips, a layer of suitable earthy material to hold the contour-strips and intermediate material, exposing the same for a period to thoroughly dry and harden the earthy material and cause the same to firmly hold the contour-strips and intermediate material and thereafter removing the foundation-plate preparatory to further treatment, substantially as set forth.

2. The method herein specified of producing ornamental slabs, consisting in applying cloisonné strips on a foundation-plate to form the contour of the pattern and introducing powdered glass or similar material between the contour-strips in a layer of less thickness than the depth of the contour-strips, applying a layer of fire-clay or similar material to hold the contour-strips and intermediate material, removing the foundation-plate and the portion of powdered glass or similar material that does not adhere to the clay or similar backing, applying a surface of enamel or similar material between the contour-strips and exposing the slab to the action of heat, substantially as set forth.

3. The method herein specified of producing ornamental slabs, consisting in applying cloisonné strips on a foundation-plate to form the contour of the pattern and introducing powdered glass or similar material between the contour-strips in a layer of less thickness than the depth of the contour-strips, applying a layer of fire-clay or similar material to hold the contour-strips and intermediate material, removing the foundation-plate and the portion of powdered glass or similar material that does not adhere to the clay or similar backing, applying a surface of enamel or similar material to the cloisonné strips, and between the contour-strips, and exposing the slab to the action of heat, substantially as set forth.

4. The method herein specified of producing ornamental slabs, consisting in applying cloisonné strips on a foundation-plate to form the contour of the pattern and introducing powdered glass or similar material between the contour-strips in a layer of less thickness than the depth of the contour-strips, applying a layer of fire-clay or similar material to hold the contour-strips and intermediate material, removing the foundation-plate and the portion of powdered glass or similar material that does not adhere to the clay or similar backing, applying a surface of enamel or similar material between the contour-strips and exposing the slab to the action of heat, and then grinding or polishing the surface of the slab, substantially as set forth.

Signed by me this 28th day of January, 1899.

THEOPHIL PFISTER.

Witnesses:
WALTER J. SKERTEN,
GEO. J. B. FRANKLIN.